US006611657B2

(12) United States Patent
Flannery

(10) Patent No.: US 6,611,657 B2
(45) Date of Patent: *Aug. 26, 2003

(54) PERIPHERAL STORAGE MEDIA DRIVE ADAPTER

(75) Inventor: Michael R. Flannery, Sioux City, IA (US)

(73) Assignee: Gateway, Inc., North Sioux City, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/082,605

(22) Filed: Feb. 25, 2002

(65) Prior Publication Data

US 2002/0085834 A1 Jul. 4, 2002

Related U.S. Application Data

(63) Continuation of application No. 09/119,911, filed on Jul. 21, 1998.

(51) Int. Cl.[7] .......................... H04N 5/781; H04N 5/85; H04N 5/90; H04N 5/91; H04B 1/20
(52) U.S. Cl. .......................................... 386/125; 369/10
(58) Field of Search .......................... 386/45, 125–126; 369/1–2, 10–11

(56) References Cited

U.S. PATENT DOCUMENTS

| 4,510,589 | A | * | 4/1985 | Ito ............................... 360/137 |
| 5,243,495 | A | * | 9/1993 | Read et al. ............... 360/97.01 |
| 5,889,515 | A | * | 3/1999 | McDade et al. ......... 707/500.1 |
| 5,910,933 | A | * | 6/1999 | Moore .......................... 369/2 |
| 6,035,395 | A | * | 3/2000 | Saito ............................. 713/1 |
| 6,169,847 | B1 | * | 1/2001 | Mizoguchi et al. ......... 386/111 |
| 6,424,796 | B2 | * | 7/2002 | Flannery ..................... 386/125 |

* cited by examiner

Primary Examiner—Andrew Christensen
Assistant Examiner—Polin Chieu

(57) ABSTRACT

An adapter for receiving a surplus optical storage media drive capable of stand-alone playing of optical storage media is described. The adapter provides at least the minimum level of functionality required, together with the surplus optical storage media drive, to play optical storage media in order to extend the useful life of the surplus drive. The optical storage media may include compact disks, CD-ROMs, DVDs or the like type of storage media. The adapter provides the capability of connecting with external devices that improve the functionality and usefulness of the drive-adapter system.

28 Claims, 7 Drawing Sheets

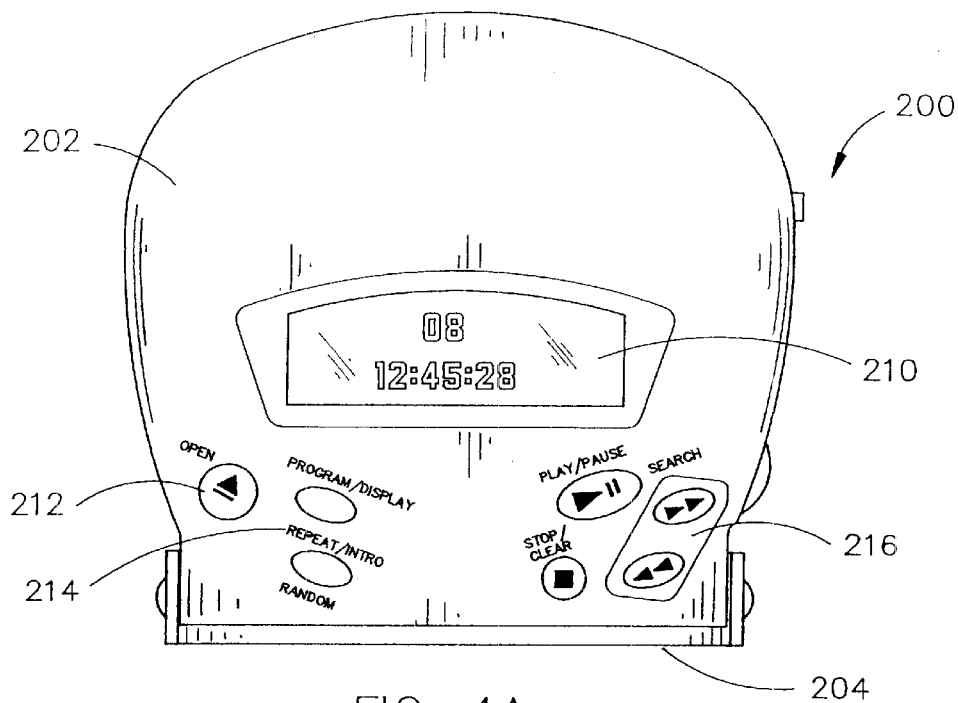
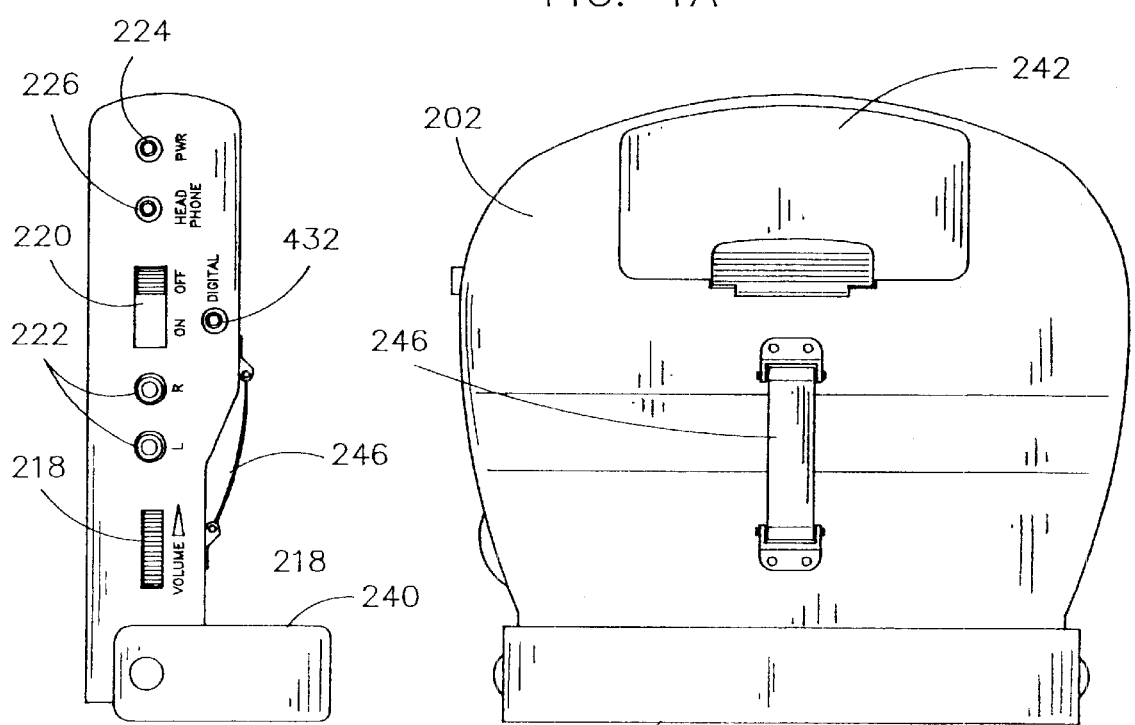
FIG. 4A
FIG. 4B    FIG. 4C

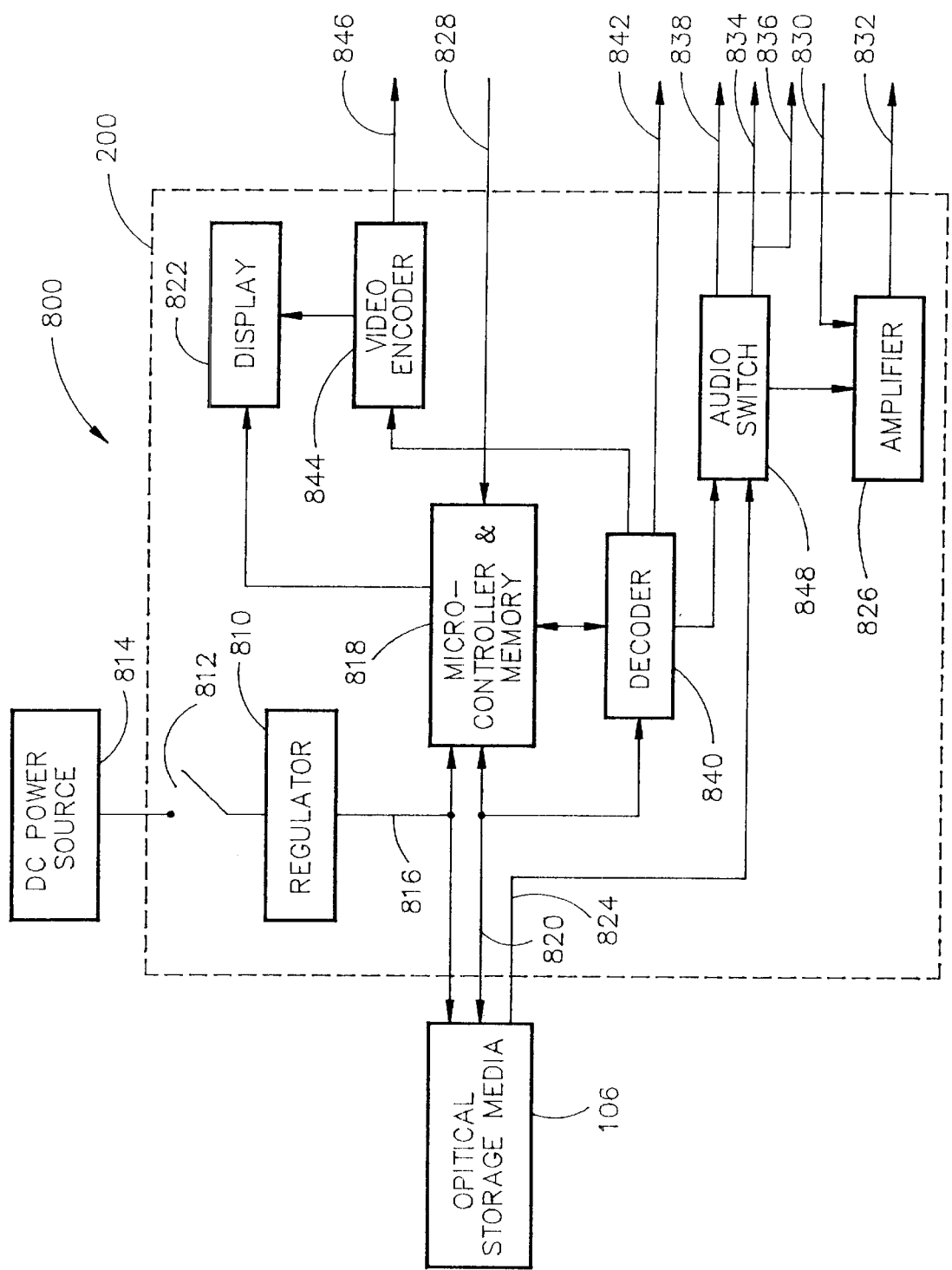

PERIPHERAL STORAGE MEDIA DRIVE ADAPTER

CROSS REFERENCE TO RELATED APPLICATIONS

The present application continuation to U.S. patent application Ser. No. 09/119,911, filed July 21, 1998, which is herein incorporated by reference in its entirety.

BACKGROUND OF THE INVENTION

The present invention generally relates to digital information storage systems, and more particularly to optical storage systems.

Optical storage media such as compact disks (CDs), read-only memory compact disks (CD-ROMs), and digital versatile disks (DVDs) have become an information storage standard for personal computer information handling systems. Thus, most personal computers are provided with a CD-ROM or DVD drive for reading compact disks or DVDs. However, rapid technological advances have continually produced optical storage media drives having increased operating speeds and improved features, and it appears likely that this trend will continue. The speed of a CD-ROM drive is typically measured with respect to multiples of the original CD-ROM drive specification. Thus, a 2×CD-ROM drive can access the data encoded on the CD-ROM at twice the data rate of the original standard. At present, CD-ROM drive speed multiples are in double digits, and no end to the trend for continual rate increases appears to be in sight. As CD-ROM and other media drive speeds increase and more features are added, new software applications are written to take advantage of the higher speeds and features, thereby encouraging the user to upgrade the slower CD-ROM drive to a faster one. As a result, older and slower CD-ROM drives rapidly become obsolete when personal computer users purchase newer and faster CD-ROM drives, thereby causing a surplus of older and slower drives to accumulate. The same trend is certain to occur for digital versatile disk drives and for other optical storage media drives.

One capability that all optical disk drives share in common is the ability to play audio formatted compact disks. Since the standard reference CD-ROM speed (1×) is the speed at which audio compact disks are played, all CD-ROM drives are capable of playing audio formatted compact disks. In addition, only a subset of the command set used to control CD-ROM drives is required to play back audio compact disk recordings. Thus, it would be desirable to provide an older, surplus CD-ROM drive unit with the capability of playing audio compact disks in order to extend the useful life of the drive. Further, as surplus DVD drives accumulate, it would be desirable to provide an older, surplus DVD drive with the ability to play audio and video formatted optical disks.

SUMMARY OF THE INVENTION

The present invention is directed to an adapter for providing stand-alone use of an optical storage media drive such as a compact disk or digital versatile disk. The adapter receives an optical storage media drive that was originally designed for operation in conjunction with a computer system wherein the computer system controls the operation of the drive. However, instead of being utilized in conjunction with a computer system, the optical storage media drive is utilized in conjunction with the adapter of the present invention wherein the adapter controls operation of the drive. The adapter and the optical storage media drive, in combination, provide a system which is capable of reading and playing optical media independently from the computer system. Such an adapter comprises a housing for receiving the optical storage media drive and a circuit disposed within the housing for interfacing with the optical storage media drive wherein the optical storage media drive may read an optical storage medium completely independent of the computer system.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIGS. 4A–C are top, bottom and side elevation views of the adapter of FIG. 3 further showing the features thereof;

FIG. 8 is a block diagram of the components if an adapter circuit for reading and reproducing information from either an audio compact disk or a digital versatile disk.

DETAILED DESCRIPTION

Reference will now be made in detail to the presently preferred embodiment of the invention, an example of which is illustrated in the accompanying drawings.

Figure 1:
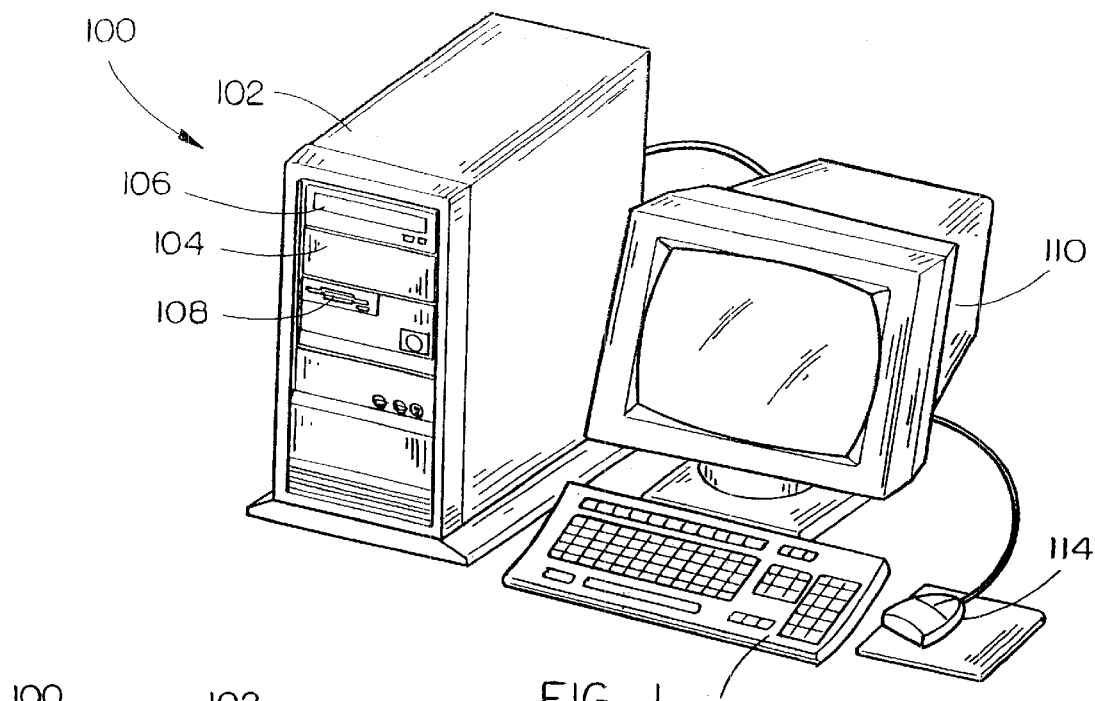
FIG. 1 is an illustration of an optical storage media drive as utilized in a personal computer system.

Referring now to FIG. 1, an illustration of an optical media drive such as a CD-ROM or DVD drive utilized in a personal computer system is shown. The personal computer system 100 generally comprises a housing 102 that contains the electronic components of the computer system. The housing 102 provides a series of drive bays 104 in which peripheral storage media drives (106, 116) may be installed such as an optical storage media drive 106 and floppy disk drive 108. The computer system 100 further comprises a display device 110, keyboard 112 and graphical input device 114. The optical storage media drive 106 is typically provided with the personal computer system 100 for reading computer readable data encoded on an optical storage media such as a compact disk. A compact disk (CD) is storage medium having a plastic substrate embossed with a pattern of pits that encode signals (e.g., audio or data) in an optically readable digital format. The disk is coated with a metallic layer to enhance its reflectivity and is read in an optical storage media drive or CD player that reflects a laser beam off of the disk as it rotates and detects fluctuations of the reflected intensity due to the presence or absence of the pits.

Figure 2:
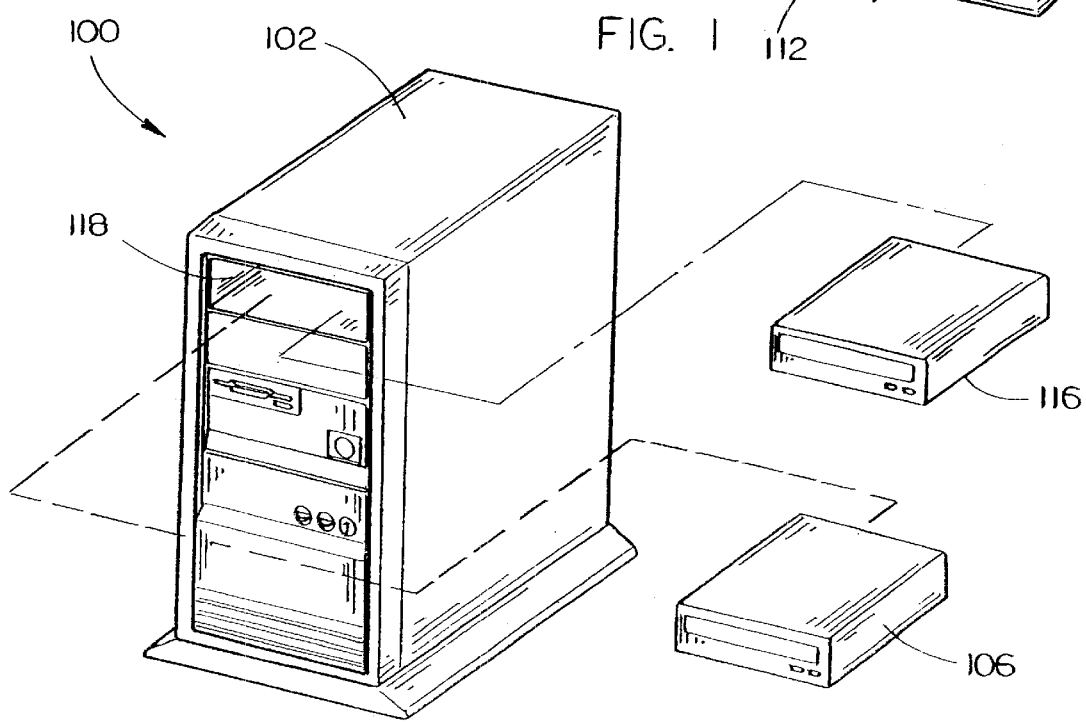
FIG. 2 illustrates the replacement of the optical storage media drive of FIG. 1 with an advanced optical storage media drive.

Referring now to FIG. 2, the replacement of the optical storage media drive of FIG. 1 with an advanced optical storage media drive is shown. A typical optical storage media drive 106 is constructed to have a size and shape to fit into a standard sized drive bay 118 found in most personal computers. The housing 102 of the computer system 100 is designed to modularly receive a number of peripheral storage media such as hard disks, floppy disks, optical storage media drives, PC-CARD drives, etc. such that the user may install a particular combination of storage media drives as desired. As faster and more advanced optical storage media drives are developed, the user may replace the old optical storage media 106 drive with a newer model drive 116. Since the housing 102 of the computer is designed to be modular, replacing an old optical storage media drive 106 merely involves disconnecting the internal cabling and unfastening the drive from the housing, and then connecting the new drive 116 to the same cabling and installing the new drive in the same drive bay 118.

Figure 3:
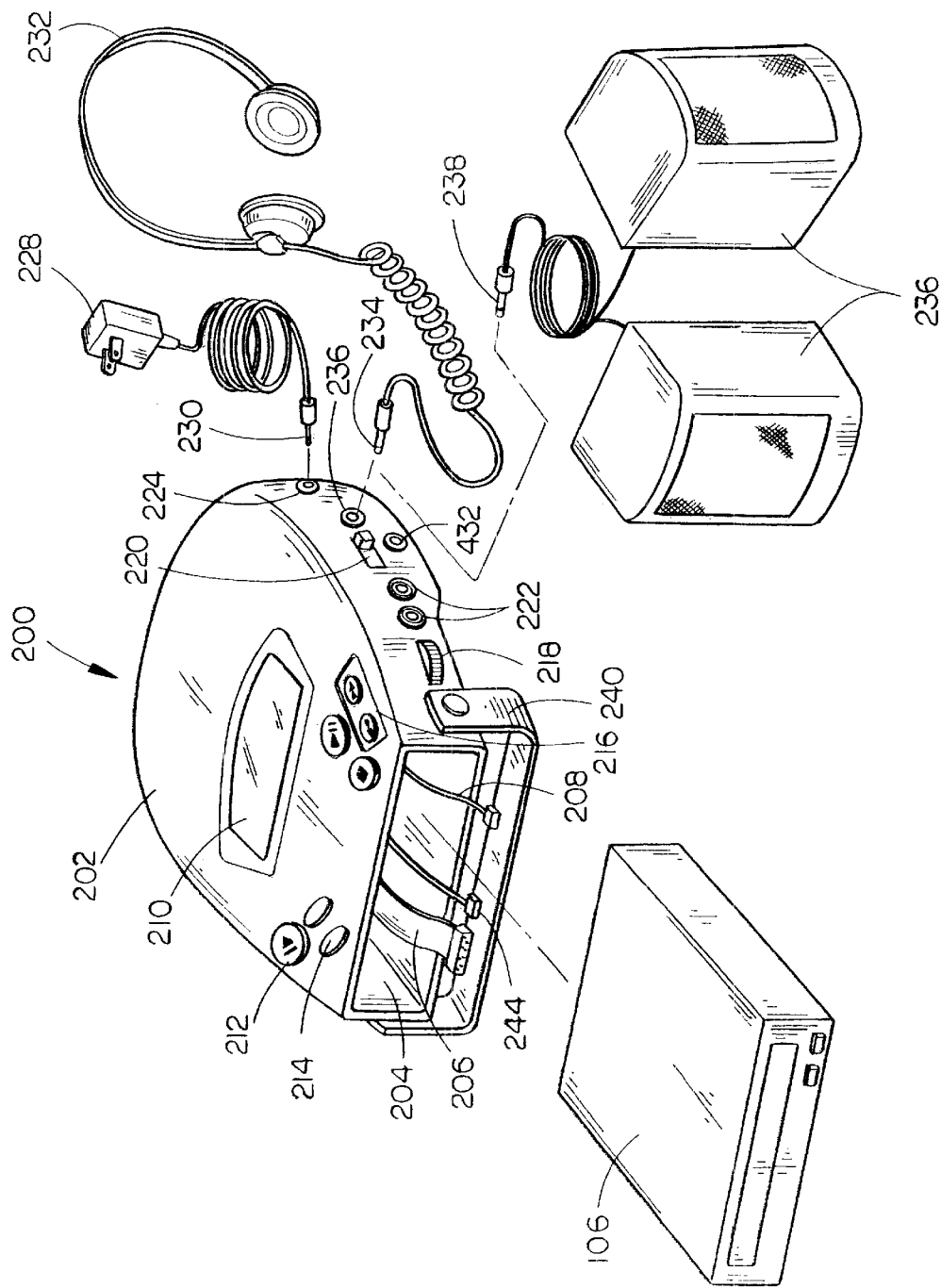
FIG. 3 is an illustration of an adapter designed to receive a surplus optical storage media drive.

Referring now to FIG. 3 an adapter designed to receive an optical storage media drive in accordance with the present invention will be described. The adapter 200 as shown in FIG. 3 is designed to receive an optical storage media drive 106. The adapter 200 provides a housing 202 having a bay 204 similar to the bay 118 of the computer housing 102.

The bay 204 of the housing 202 includes a connector 206 for electrically connecting the adapter 200 with the optical storage media drive 106. Bay 204 may include an additional connector 208 for supplying operational power from the adapter 200 to the optical storage media drive 106, for example. Connector 244 receives the audio output signal (left and right channel signals) from drive 106. Connectors 206, 208 and 244 preferably facilitate rapid connection to optical storage media drive 106 which is inserted and fastened into bay 204. Adapter 200 includes a display 210 for displaying operational information such as track selection, program length, etc. of the material recorded on an optical storage disk inserted into the optical storage media drive 106. The display may also display related information such as the last selected command (e.g., play, pause, stop), for example.

In an alternative embodiment, the display 210 may be of sufficient size and construction to allow the full screen viewing of video in the case where the drive 106 is a DVD or similar type of video drive wherein the video output of the drive is capable of being displayed on the display 210. Adapter 200 further includes user interface and control buttons 212, 214 and 216 for controlling the operation of adapter 200 and optical storage media drive 106. Adapter 200 may include a volume control 218, line level output jacks 222, and an on-off switch 220. Adapter 200 further provides a power jack 224 for receiving power from an external power supply 228 having an appropriate plug 230 for mating with jack 224. Adapter 200 also provides an audio output jack 236 providing an output signal for driving a pair of headphones 232 or external speakers 238, each of which having an appropriate plug 234 and 238 for mating with jack 236. The speakers may be driven by the output signal provided by jack 236, or the speakers may contain a separate amplifier amplifying the output signal of the jack 236 to a greater level. Additionally, adapter 200 may include a digital output jack 432 for supplying a digital signal to an external device such as a receiver or amplifier capable of receiving a digital signal to maintain signal fidelity. The digital signal provided at jack 432 may be electronic or optical and may include data, audio or video information. Adapter 200 may include a handle 240 which may be positioned to facilitate carrying of the adapter 200 by hand or function as a stand when placed on a surface to provide stability.

Referring now to FIGS. 4A–C, top, bottom and side elevations of the adapter of the present invention are shown. The top view of 4A illustrates the display 210 and user interface keys 212, 214 and 216. Button 212 may be designated to control opening or closing the disk tray (not shown) of the optical storage media drive for inserting and removing optical storage media (e.g., compact disks). Program select keys 214 are included to control and select program information for a compact disk inserted into the optical storage media drive. Control keys 216 provide play control functions for the playing of a particular track on the compact disk, for example play, pause, stop, search forward, search reverse, etc.

FIG. 4B illustrates in further detail the control and interface features of the adapter 200. A volume control 218 controls the playback amplitude level of the compact disk selection. Output jacks 222 provide a line level output signal for driving an external device such as a preamplifier, surround sound processor, receiver, etc., and may be RCA-type jacks, for example. On/off switch 220 connects or disconnects power from the internal components of the adapter 200 and optical storage media drive 106. Jack 226 provides a signal for driving a pair of headphones or small speakers, and may be a suitable standard ⅛ inch jack. Power jack 224 receives power from an external power supply which converts ac power into dc power. The digital output jack 432 provides a digital output signal for connection to an external digital device. A strap or loop 246 may be provided for facilitating carrying of the adapter, for example by passing the user's belt through loop 246.

FIG. 4C shows a bottom view of the adapter 200. A battery compartment 242 may be included to provide operational power from batteries during portable use.

Figure 5:
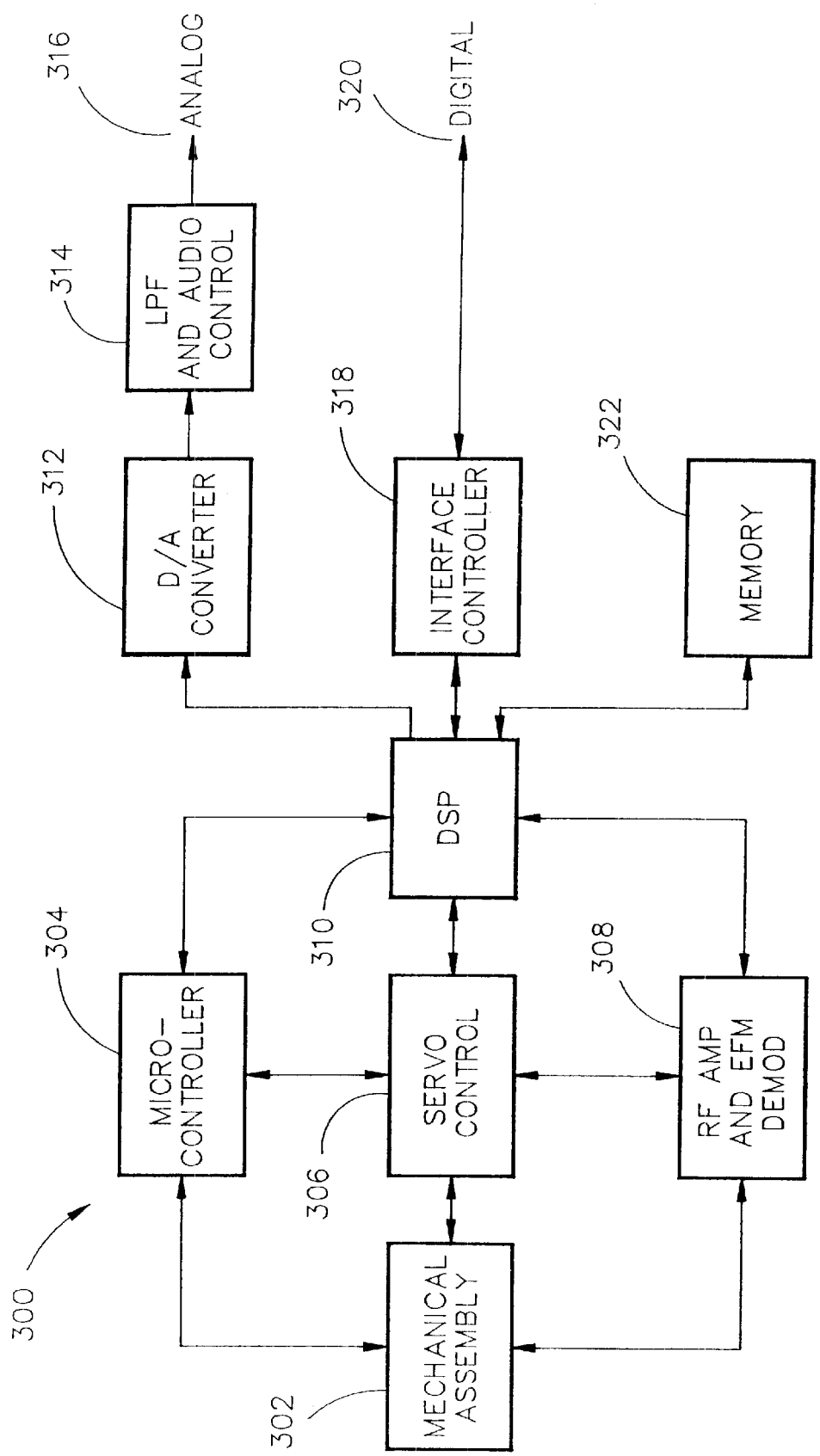
FIG. 5 is a block diagram of the components of a typical optical storage media drive circuit.

Referring now to FIG. 5, a block diagram of the system of a typical optical storage media drive is shown. System 300 includes a mechanical assembly 302 for rotating or driving an optical storage medium inserted in the drive and for controlling the tracking of the laser beam across the surface thereof. System 300 also includes a microcontroller 304, servo control circuit 306, RF amplifier and EFM (eight-to-fourteen modulation) demodulator 308, and a processor which is typically a digital signal processor 310. Digital signal processor 310 may be utilized to decode the information stored on the optical storage media (not shown) inserted in drive 106.

Figure 6:
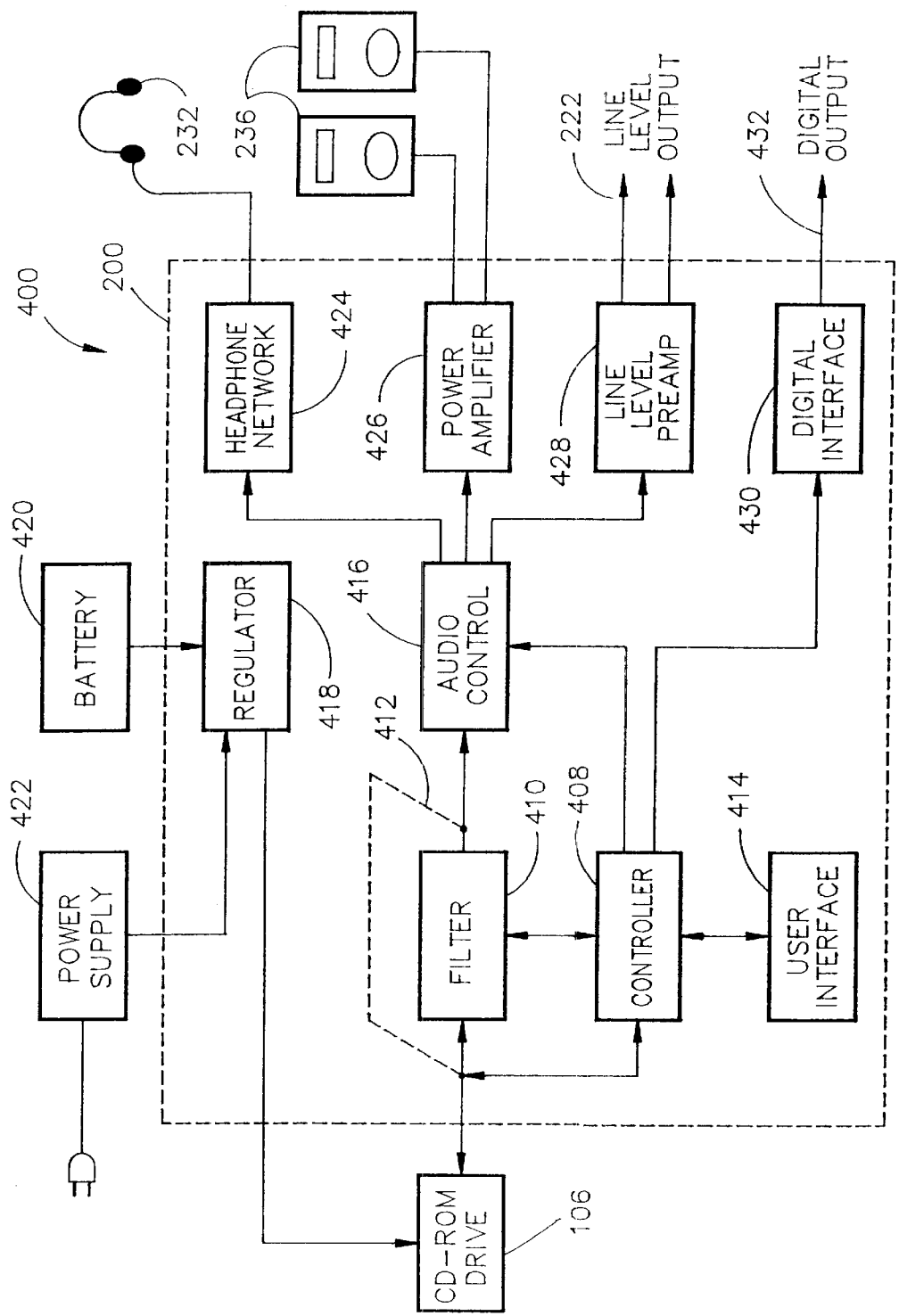
FIG. 6 is a block diagram of the components of an adapter circuit of the present invention.

System 300 may also include a digital to analog converter 312 and low pass filter (LPF) 314 for providing an analog output signal 316. Further, system 300 includes an interface controller 318 for providing integrated drive electronics/AT attachment (IDE/ATA) or small system computer interface (SCSI) or the like control of the optical interface controller 318 through digital control 320 from a host computer (not shown) in which the optical storage media drive is utilized ('AT' refers to the architecture of a specific model of personal computers (PC) known as the PC-AT introduced by International Business Machines Corporation circa 1984 adopted as an industry standard and being synonymous with personal computers having an industry standard architecture (ISA) bus; 'AT' apparently is not an acronym). Digital control 320 may be data, control, address, audio or video signals, for example. Further, a memory 322 is provided which may be a random access memory for storing executable instructions of digital signal processor 310 or as a data buffer, for example. Normally, the optical storage media drive is utilized in a host computer system such as computer system 100 of FIG. 1 wherein operation of the optical storage media drive is controlled by the computer system including providing operational power thereto. The adapter components of the present invention, as discussed in further detail with respect to FIG. 6, provide operation and control functions of the optical storage media drive in lieu of computer system 100. When optical storage media drive 300 is installed in bay 204 of adapter 200 shown in FIG. 3, connector 244 receives analog output signal 316 of drive 300, and connector 206 couples with digital control 320.

Referring now to FIG. 6, a block diagram of the circuitry of the adapter of the present invention is shown. Adapter 400 provides at least the minimum amount of electronics and power required to operate the optical storage media drive 106 sufficient to play an appropriately formatted optical storage disk. Adapter 400 includes components 200 which are disposed within the adapter housing. Optical storage media drive 106 may connect to a controller 408 which receives an output signal from the optical storage media drive 106 provided through an audio control circuit 416 to a headphone network 424 to drive a pair of headphones 232. Controller 408 may implement at least a subset of commands for a particular drive control interface, such as an integrated drive electronics (IDE) drive, also known as AT attachment (ATA), or a small computer system interface (SCSI), as the minimum command set required to play the desired format of optical storage media.

A filter 410, such as a low pass filter, may be included to filter the output signal from the optical storage media drive which may be optionally bypassed 412. A user interface 414 allows for the user to control the playback functions of the optical storage media drive. User interface 414 may include control circuits (not shown) in conjunction with buttons 212, 214, 216 and display 210 of FIG. 4A to control the operation of the optical storage media drive 106 of FIG. 3. Power may be supplied to the adapter components 200 and to the optical storage media drive from a battery 420 or from an external power supply 422. A regulator 418 may be further included with the adapter components 200 to provide regulated power and may provide voltage or current regulation or a combination thereof.

A power amplifier 426 may be included in the adapter 400 for providing a signal of sufficient magnitude to drive one or more speakers 236. Alternatively, one or more speakers 236 may be included within the adapter 400 such that external speakers would not be required. A line level preamplifier 428 may be included to provide a line level output 222 to an external device such as an amplifier or sound processor (not shown). Interface circuit 430 may provide a digital output signal at jack 432. The digital signal may be electronic or optical and may be audio, video or combined signal.

Alternatively, output jack 432 may provide an analog video output signal through appropriate modification of interface circuit 430 in the case where an analog video output signal is desired. The analog video output signal may be an RF modulated or base band composite video output signal for driving the input of an appropriate video device such as a television, VCR or camcorder, etc., which in conjunction with audio outputs 222 provides combined video and audio playback of an appropriate optical storage disk (e.g., DVD). Thus, system 300 of FIG. 5 and the adapter circuit components 200 of FIG. 6 together provide a system which is capable of playing appropriately formatted optical storage media as a stand-alone unit.

Figure 7:
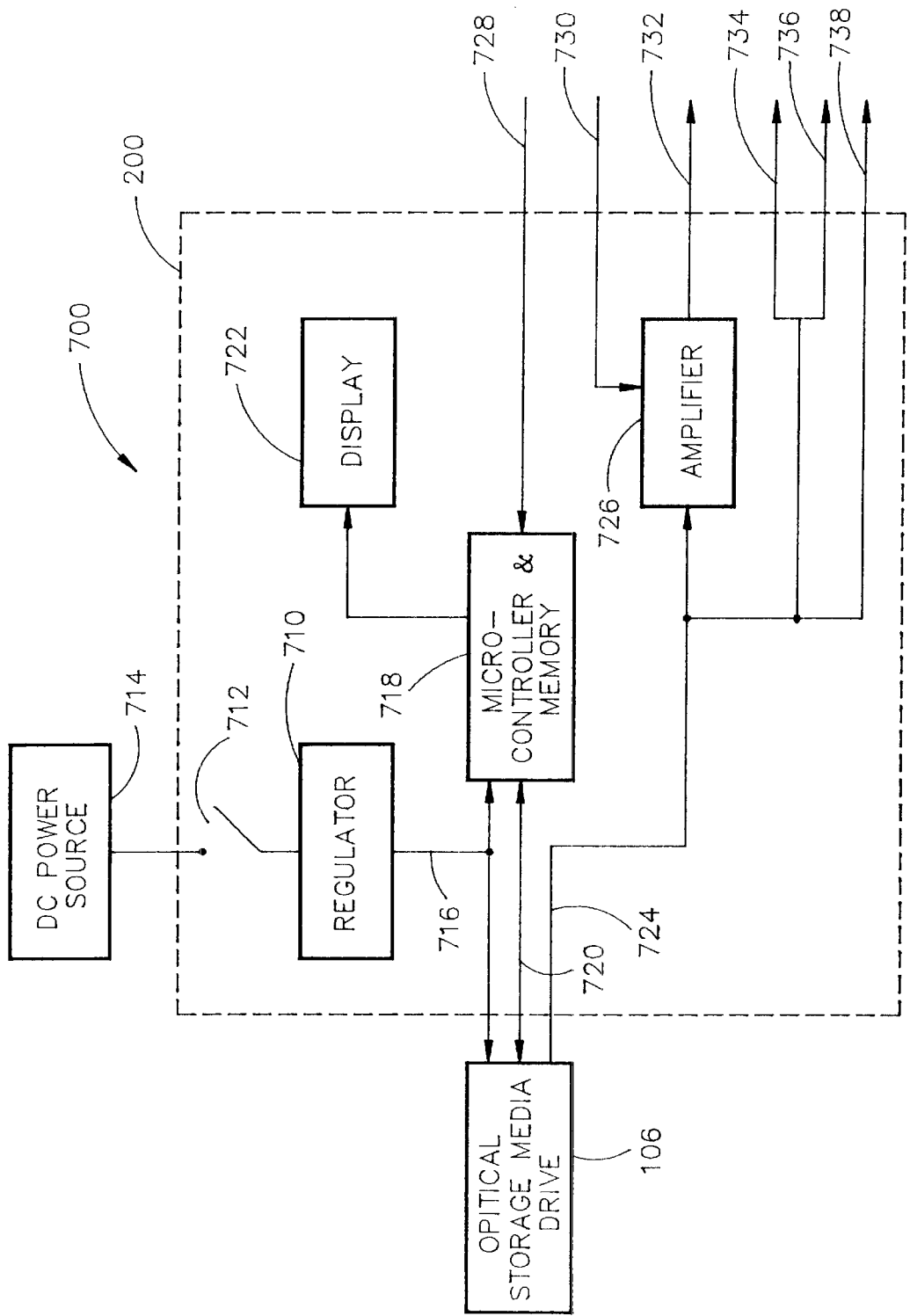
FIG. 7 is a block diagram of the components of an adapter circuit for reading and reproducing information from an audio compact disk.

Referring now to FIG. 7, a block diagram of an adapter for reading and reproducing information from an audio compact disk will be discussed. The audio CD player adapter 700 includes components internally disposed within adapter 200. Adapter 200 may receive power from an external power source 714, which may be an ac-to-dc converter connecting to adapter at power jack 224, or one or more batteries which may be installed within battery compartment 242, as shown in FIG. 4B. Switch 712 controls the powering on and off of adapter 200. A regulator 710 maintains the output of power source 714 at a constant voltage level. Regulator 710 provides a supply voltage to all of the electrical components of adapter 200 requiring a supply voltage. Microcontroller and memory 718 interface with the digital interface 720 of an external optical storage media drive 106. Digital interface 720 may correspond to digital interface 320 of FIG. 5. Microcontroller and memory 718 interfaces with display 722 for displaying information to a user of adapter 200. A user may control adapter 200 and optical storage media drive 106 via an input control line 728. Control information is provided to microcontroller and memory 718 via control Line 728 which receives signals from control buttons 212, 214 and 216 of FIGS. 3 and 4A when actuated by a user.

The audio CD player adapter embodiment 700 illustrated in FIG. 7 is intended to read and reproduce audio information stored on a compact disk inserted into optical storage media drive 106. Audio information stored on optical storage media 106 is converted from an optical signal to an electrical signal which is provided from drive 106 to adapter 200 via an audio output line 724. Audio output line 724 may correspond to analog output 316 of FIG. 5. The electrical signal on line 724 is coupled to amplifier 726 that provides an amplified output 732 to an external jack such as jack 226 of FIGS. 3 and 4B for coupling to a pair of headphones 232 or speakers 236 for transforming the electrical audio signal into an acoustical signal representative of the information stored on a compact disk inserted into drive 106. Additionally, the audio electrical signal may be provided as left and right line level outputs 734 and 736 via output jacks 222 of FIGS. 3 and 4B, which may be standard RCA jacks, or as a line level output 738 to an output jack, which may be a ⅛" stereo jack (not shown), for driving an external audio amplifier (not shown). A volume control 730 controls the output level of amplifier 726.

Referring now to FIG. 8, a block diagram of an adapter for reading and reproducing information from an audio compact disk or a video and audio digital versatile disk will be discussed. The audio and video media adapter 800 includes components internally disposed within adapter 200. Adapter 200 may receive power from an external power source 814, which may be an ac-to-dc converter connecting to adapter at power jack 224, or one or more batteries which may be installed within battery compartment 242, as shown in FIG. 4B. Switch 812 controls the powering on and off of adapter 200. A regulator 810 maintains the output of power source 814 at a constant voltage level. Regulator 810 provides a supply voltage to all of the electrical components of adapter 200 that require a supply voltage. Microcontroller and memory 818 interface with the digital interface 820 of an external optical storage media drive 106. Digital interface 820 may correspond to digital interface 320 of FIG. 5. Microcontroller and memory 818 interfaces with a display 822 for displaying information to a user of adapter 200. A user may control adapter 200 and optical storage media drive 106 via an input control line 828. Control information is provided to microcontroller and memory 818 via control line 828 which receives signals from control buttons 212, 214 and 216 of FIGS. 3 and 4A when actuated by a user.

The audio CD and audio and video DVD player adapter embodiment 800 illustrated in FIG. 8 is intended to read and reproduce audio information stored on a compact disk or audio and video information stored on a digital versatile disk inserted into optical storage media drive 106. Audio information stored on an optical storage medium in drive 106 is converted from an optical signal to an electrical signal which is provided from drive 106 to adapter 200 via an audio output line 824. Audio output line 824 may correspond to analog output 316 of FIG. 5. The electrical signal on line 824 is coupled via an audio switch 848 to amplifier 826 that provides an amplified output 832 to an external jack such as jack 226 of FIGS. 3 and 4B for coupling to a pair of headphones 232 or speakers 236 for transforming the electrical audio signal into an acoustical signal representative of the information stored on a compact disk inserted into drive 106. Additionally, the audio electrical signal may be provided as left and right line level outputs 834 and 836 via output jacks 222 of FIGS. 3 and 4B, which may be standard RCA jacks, or as a line level output 838 to an output jack, which may be a ⅛" stereo jack (not shown), for driving an external audio amplifier (not shown). A volume control 830 controls the output level of amplifier 826.

For reading and reproducing audio and video information stored on a DVD inserted into drive 106, a decoder 840 couples to digital interface 820 and microcontroller and memory 818. Decoder 840 decodes audio and video information stored on a DVD inserted in drive 106 from the format in which the information is encoded (e.g., MPEG2, AC3, etc.). Decoder 842 may provide a direct digital audio output signal (such as an AC3 audio signal) to an external amplifier system (not shown) capable of receiving a digital output signal and transforming the digital output signal into an acoustic signal. Decoder 840 further provides a digital video output signal to a video encoder 844 that converts the digital video signal into an appropriate standard video signal (e.g., NTSC, PAL). Video encoder 844 provides a standard video output signal via line 846 to an appropriate video reproduction device such as a television, monitor, or video recorder (not shown) for transforming the video output signal into a video picture. In one embodiment, video encoder 844 may provide a video signal to display 822 wherein display 822 corresponds to display 210 of FIGS. 3 and 4A such that display 210 is capable of displaying video information stored on an optical storage media inserted in drive 106.

It is believed that the optical storage media drive adapter for stand-alone use of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for obtaining data from a peripheral storage media drive, comprising:
    a peripheral storage media drive suitable for reading information;
    an adapter including a housing, the housing suitable for removable receiving the peripheral storage media drive, wherein the adapter is capable of utilizing a subset of a command set used to control the peripheral storage media drive, wherein the subset enables the adapter to output data from the peripheral storage media drive; and
    a computer system suitable for being communicatively coupled to the peripheral storage media drive, the computer system capable of utilizing the command set used to control the peripheral storage media drive;
    wherein the adapter is suitable for outputting data received from peripheral storage media drive but is incapable of outputting data accessible by the computer system from the peripheral storage media drive.

2. The system as described in claim 1, wherein the adapter includes controller for controlling the operation of the peripheral storage media drive.

3. The system as described in claim 2, wherein the controller includes an interface for providing user control of the peripheral storage media drive.

4. The system as described in claim 1, further comprising at least one control button disposed on said housing suitable for controlling operation of the peripheral storage media drive.

5. The system as described in claim 1, wherein the adapter provides operational power to the peripheral storage media drive.

6. The system as described in claim 1, wherein the peripheral storage media drive includes at least one of an optical storage media drive, a hard disk drive and floppy drive.

7. The system as described in claim 1, further comprising an output jack mounted on the housing and configured to output said data from the peripheral storage media drive comprising a digital output signal.

8. The system as described in claim 1, further comprising an output jack mounted on the housing and configured to output said data from the peripheral storage media drive comprising an analog output signal.

9. The system as described in claim 8, wherein the analog output signal comprises an analog television signal.

10. A peripheral storage media drive adapter, comprising:
    a housing, the housing suitable for removable receiving a peripheral storage media drive; and
    a controller disposed within the housing, wherein the controller is capable of utilizing a subset of a command set used to control the peripheral storage media drive, the subset enabling the controller to output data from the peripheral storage media drive;
    wherein the controller is suitable for outputting data received from peripheral storage media drive but is incapable of outputting data accessible by a computer system from the peripheral storage media drive.

11. The peripheral storage media drive adapter as described in claim 10, wherein the controller includes an interface for providing user control of the peripheral storage media drive.

12. The peripheral storage media drive adapter as described in claim 10, further comprising at least one control button disposed on said housing suitable for controlling operation of the peripheral storage media drive.

13. The peripheral storage media drive adapter as described in claim 10, wherein the adapter provides operational power to the peripheral storage media drive.

14. The peripheral storage media drive adapter as described in claim 10, wherein the peripheral storage media drive includes at least one of an optical storage media drive, a hard disk drive and floppy drive.

15. A system for obtaining data from an optical storage drive, comprising:
- a peripheral storage media drive suitable for reading information contained on a medium inserted into the peripheral storage media drive;
- means for adapting, the adapting means including a housing for removable receiving the peripheral storage media drive, wherein the adapting means is capable of utilizing a subset of a command set used to access an peripheral storage media drive; and
- a computer system suitable for being communicatively coupled to the peripheral storage media drive, the computer system capable of utilizing the command set used to access computer data;
- wherein the subset of the command set configures the adapting means for outputting data received from the peripheral storage media drive as read from a medium but is incapable of outputting data accessible by the computer system from the peripheral storage media drive.

16. The system as described in claim 15, wherein the adapting means includes a controller for controlling the operation of the peripheral storage media drive.

17. The system as described in claim 16, wherein the adapting means includes an interface for providing user control of the peripheral storage media drive.

18. The system as described in claim 15, further comprising at least one control button disposed on said housing suitable for controlling operation of the peripheral storage media drive.

19. The system as described in claim 15, wherein the adapter provides operational power to the peripheral storage media drive.

20. A stand-alone adapter for a peripheral storage media drive from a computer system, the adapter comprising:
- a housing disposed to removably receive the peripheral storage media drive in a drive bay of the housing, wherein the peripheral storage media drive is suitable for reading information from peripheral storage media of the peripheral storage media drive;
- a connector disposed within the drive bay and configured to be electrically connected to the peripheral storage media drive when the peripheral storage media drive is residing in the drive bay;
- a controller adapted to control the peripheral storage media drive using a subset of a command set used in the computer system to control the peripheral storage media drive;
- a memory configured to store the subset of the command set; and
- a display screen configured to display images associated with the information from the peripheral storage media;
- wherein the adaptor is suitable for outputting data associated with the information from the peripheral storage media drive but is not suitable for outputting computer data accessible by the computer system from the peripheral storage media drive.

21. The adapter as described in claim 9, wherein the connector is a first connector, the adapter further comprising a second connector disposed on an external surface of the housing and configured to be communicatively connected to the computer system.

22. The adapter as described in claim 9 wherein the images are associated with a track selection of the peripheral storage media disk inserted in the peripheral storage media drive.

23. The adapter as described in claim 9 further comprising a speaker jack configured to output electrical signals associated with the information from the peripheral storage media.

24. The adapter as described in claim 9 further comprising a speaker configured to produce sound associated with the information from the peripheral storage media.

25. The adapter as described in claim 9 wherein peripheral storage media drive is a DVD drive.

26. The adapter as described in claim 9 wherein peripheral storage media drive is a CD drive.

27. The adapter as described in claim 9 wherein peripheral storage media drive is a hard drive.

28. The adapter as described in claim 9 wherein peripheral storage media drive is a floppy disk drive.

* * * * *